United States Patent [19]

Hreha

[11] 4,009,006
[45] Feb. 22, 1977

[54] WATER TO FUEL CONVERTER
[76] Inventor: Frank Hreha, Sun Valley Drive, Croton Falls, N.Y. 10518
[22] Filed: Aug. 18, 1975
[21] Appl. No.: 605,439
[52] U.S. Cl. .............................. 23/281; 23/288 J; 48/204; 48/212; 123/3; 423/652
[51] Int. Cl.² .................... B01J 1/00; B01J 8/00; C01B 1/18
[58] Field of Search ............... 48/212, 180 H, 204; 23/281, 253 PC, 288 J, 288 R; 423/651, 652, 657; 123/3

[56] References Cited
UNITED STATES PATENTS

| | | | |
|---|---|---|---|
| 1,016,741 | 2/1912 | Fritz | 48/180 H |
| 1,059,817 | 4/1973 | Bergius | 23/281 |
| 1,130,553 | 3/1915 | Wladkowsky | 48/180 H |
| 1,525,824 | 2/1925 | Palmer | 423/651 |
| 1,630,048 | 5/1927 | Balachowsky et al. | 23/288 J |
| 1,966,345 | 7/1934 | Harrell | 123/121 |
| 2,295,209 | 9/1942 | Guiles et al. | 123/3 X |
| 2,769,366 | 11/1956 | Honma | 23/253 PC X |
| 3,451,782 | 6/1969 | Jensen | 23/281 |
| 3,635,200 | 1/1972 | Rundell et al. | 123/3 |
| 3,653,364 | 4/1972 | Bogan | 123/3 |

Primary Examiner—Morris O. Wolk
Assistant Examiner—Arnold Turk

[57] ABSTRACT

A water to fuel converter comprises an apparatus for utilizing gases produced from a water source to power internal combustion engines. The apparatus includes means for heating a supply of liquid water and introducing it in a fine spray into the base of an insulated chamber containing a series of electrically heated copper screens. As the heated water passes through the copper screens, it is at least partially decomposed and the gases formed by the decomposition travel through an outlet at the top of the chamber to the carburetor of an internal combustion engine where the gases serve as a fuel. Thus, the internal combustion engine is powered by a relatively clean fuel source which can be produced from a readily available substance, such as water.

4 Claims, 1 Drawing Figure

WATER TO FUEL CONVERTER

BACKGROUND OF THE INVENTION

The present invention relates to a fuel source for internal combustion engines and particularly to a water to fuel converter for said engines. The prior art discloses the basic concept of decomposing water into one or more of its constituent elements such as hydrogen and then using the gas to power internal combustion engines.

U.S. Pat. No. 2,295,209 to Guiles et al. illustrates a system wherein heated water is passed through a chamber packed with steel wool and the liberated hydrogen is passed on to an internal combustion engine. In this patent, however, the steel wool in the chamber is not heated in contrast to the highly effective heated copper screening in the present disclosure.

U.S. Pat. No. 1,059,817 to Berguis which relates to an entirely different apparatus for generation of hydrogen from water, suggests the substitution of copper for iron oxide as the catalyst or reducing agent in the reaction.

Also of general interest is U.S. Pat. No. 1,193,799 to Landis which deals with a different chemical action showing the use of a metallic wire as a reaction catalyst and the electric heating of the wire to promote the reaction.

As distinguished from the prior art disclosed above, the present invention is designed to provide an inexpensive and efficient water to fuel converter. The internal structure of the converter is readily manufactured and involves a minimum of separate components. The prior art patents are readily distinguished over the present invention since the subject converter involves a completely different structural arrangement to provide a clean and efficient source of fuel of an internal combustion engine.

SUMMARY OF THE INVENTION

The present invention relates to a water to fuel converter to provide a source of fuel to an internal combustion engine. The converter comprises a water tank having an air compressor coupled thereto to move water under pressure to a heater located in the base of the converter chamber. The water passes through the heater and into the chamber through a spray nozzle and then upwards through a plurality of copper screens. An electric heating coil is positioned about the plurality of the copper screens to heat the screens so that the water spray decomposes into its constituent elements. The combustible gases pass through an outlet on the top of a converter leading to the carburetor of an internal combustion engine which is powered thereby.

Accordingly, an object of this invention is to provide a new and improved water to fuel converter for an internal combustion engine.

Another object of this invention is to provide a water to fuel converter wherein heated water is sprayed under pressure into a converter chamber having a plurality of heated copper screens therein to catalytically reduce the water to gases for powering an internal combustion engine.

BRIEF DESCRIPTION OF THE DRAWING

Other objects and advantages of this invention may be seen more clearly from the following description when viewed in conjunction with the accompanying drawing wherein.

DETAILED DESCRIPTION OF THE DRAWING

Figure 1:
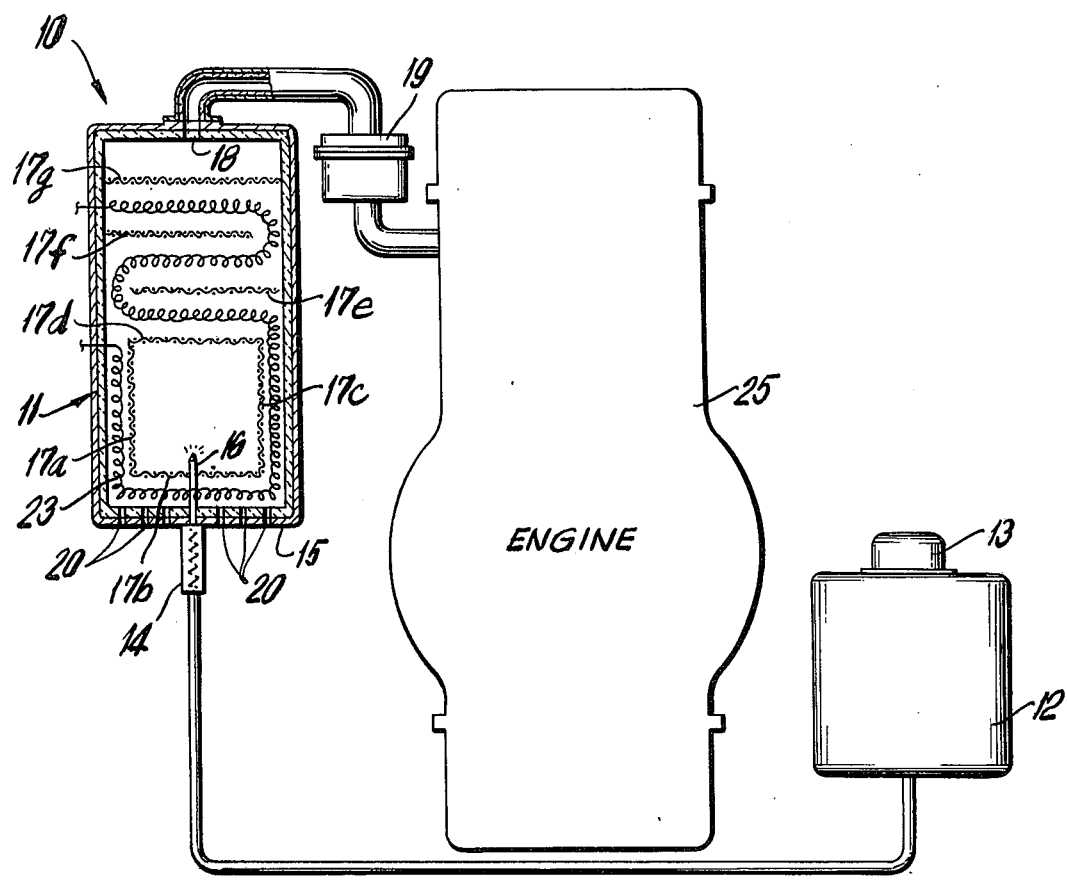
FIG. 1 is a simplified diagrammatic view of the subject invention.

Referring now to the drawing, the invention comprises a water to fuel converter 10 comprising an insulated chamber 11 having a water supply 12 connected thereto and driven by an air compressor 13 to a heater 14 adjacent to the base 15 of the chamber 11. The water passes through the heater 14 and through a spray nozzle 16 extending into the chamber wherein the water is broken up into fine particles and sprayed into the chamber 11. A plurality of copper screens 17a – 17g are located within the chamber 11 with the bottom screens 17a, 17b, 17c and 17d forming a substantially box-like configuration with the spray nozzle 16 extending into the box so that the spray must pass through an initial copper screen. The upper screens 17e and 17f are cantilevered transversely from opposite walls of the chamber 11 with an open space between the ends of said screens 17e and 17f and the walls of the chamber 11. The screen 17g extends completely across the chamber 11 and the screens are spaced a predetermined distance apart in substantially parallel planes.

An electric coil 23 is mounted in the chamber 11 and extends downwardly on one side of the rectangular screen arrangement along a plane parallel to the base 15 and then upwardly along the parallel side of the boxlike screen. The coil 23 continues substantially parallel to the cantilevered screens 17e and 17f and runs between the walls and the outer edges of the screens 17e and 17f. The coil 23 is mounted through the wall below screen 17g to a power source (not shown).

The upper portion of the chamber 11 includes an outlet aperture 18 leading to a conventional carburetor 19. The carburetor 19 is mounted to an internal combustion engine 25 and the gaseous products from the chamber 11 are burned in said engine to provide useful power.

In operation, water is pumped from the storage chamber 12 into the converter chamber 11 through a heater 14 and spray nozzle 16. As the water spray or steam contacts the electrically heated copper screens 17a – 17g it is at least partially decomposed and the heated gases formed by the decomposition are supplied from an outlet 18 at the top of the chamber 11 to a carburetor 19 on the internal combustion engine 25. A typical chamber 11 for smaller internal combustion engines would be approximately 8 inches by 16 inches in cross-section as shown in FIG. 1. Such a chamber has been successfully utilized in powering a 6 cylinder automobile engine. Air is introduced into the system through apertures 20 in the base 15 of the chamber 11. It is important for best operation that the chamber and all connections between the chamber and carburetor be insulated to maintain the elevated temperature.

In essence, while the decomposition of water may be into the constituent elements of hydrogen and oxygen with the hydrogen serving as fuel in the engine 25, there is the distinct possibility that the primary decomposition involves the liberation of hydrogen with the oxygen from the water combining with the copper in chamber 11. The copper screens thus serve as a reaction catalyst in freeing a gaseous fuel such as hydrogen from the water.

It has been found that less volume of water is normally required to run an engine than conventional gasoline fuels.

While the invention has been explained by a detailed description of certain specific embodiments, it is understood that various modifications and substitutions can be made in any of them within the scope of the appended claims which are intended to also include equivalents of such embodiments.

What is claimed is:

1. A water to fuel converter comprising:
   a pressurized water source,
   a heater connected to the water source for heating said water,
   an insulated chamber having a plurality of copper screens mounted therein,
   means for heating said chamber, comprising a heating coil mounted about said copper screens, said chamber having an outlet aperture at the upper end thereof and a plurality of air inlets in the base thereof, and,
   a spray nozzle on the outlet of the heater mounted through the base of the chamber to spray the pressurized water into said heated chamber and through the copper screens wherein it becomes decomposed into gases which escape through the outlet aperture to serve as a fuel.

2. A water to fuel converter in accordance with claim 1 wherein:
   the copper screens comprise a first box-like configuration in the bottom of said chamber and wherein the spray nozzle extends into said box-like configuration and at least two cantilevered copper screens mounted to the walls of the chamber at spaced intervals above said box-like configuration.

3. A water to fuel converter in accordance with claim 2 further including:
   a transverse copper screen extending completely across the chamber and wherein the cantilevered screens are each mounted to opposite walls of the chamber so that a space is provided between the outer end of said screen and the chamber wall.

4. A water to fuel converter in accordance with claim 2 wherein said heating coil has two ends with:
   said coil extending at one end through the chamber wall about the box-like screen configuration and then substantially parallel to the cantilevered screens in a continuous arrangement to a point on the chamber wall where the other end of the coil extends therethrough.

* * * * *